US009809314B2

(12) United States Patent
Bammann et al.

(10) Patent No.: US 9,809,314 B2
(45) Date of Patent: Nov. 7, 2017

(54) AIRCRAFT AIR CONDITIONING SYSTEM AND METHOD OF OPERATING AN AIRCRAFT AIR CONDITIONING SYSTEM

(71) Applicants: Airbus Operations GmbH, Hamburg (DE); Airbus Operations S.L., Getafe (ES)

(72) Inventors: Holger Bammann, Hamburg (DE); Frank Klimpel, Hamburg (DE); Dariusz Krakowski, Hamburg (DE); Anton Mendez-Diaz, Getafe (ES)

(73) Assignees: Airbus Operations S.L., Getafe (ES); Airbus Operations GmbH, Hamburg (DE)

( * ) Notice: Subject to any disclaimer, the term of this patent is extended or adjusted under 35 U.S.C. 154(b) by 166 days.

(21) Appl. No.: 14/715,846

(22) Filed: May 19, 2015

(65) Prior Publication Data
US 2015/0329210 A1    Nov. 19, 2015

(30) Foreign Application Priority Data

May 19, 2014    (EP) .................................. 14168774.9

(51) Int. Cl.
*F25D 17/06*    (2006.01)
*B64D 13/06*    (2006.01)
(Continued)

(52) U.S. Cl.
CPC ......... *B64D 13/06* (2013.01); *B60H 1/00435* (2013.01); *B60H 1/3211* (2013.01); (Continued)

(58) Field of Classification Search
CPC . F25B 9/06; F25B 11/02; F25B 9/004; B64D 13/08; B64D 13/00; B64D 13/06;
(Continued)

(56) References Cited

U.S. PATENT DOCUMENTS 4,963,174 A * 10/1990 Payne .................... B64D 13/06
62/172
5,461,882 A * 10/1995 Zywiak .............. B60H 1/00007
62/401
(Continued)

FOREIGN PATENT DOCUMENTS

DE    102008053320    5/2010
DE    102010054448    6/2012
(Continued)

OTHER PUBLICATIONS

European Search Report, dated Nov. 4, 2014.

*Primary Examiner* — Frantz Jules
*Assistant Examiner* — Steve Tanenbaum
(74) *Attorney, Agent, or Firm* — Greer, Burns & Crain, Ltd.

(57) ABSTRACT

An aircraft air conditioning system comprises a process air line configured to supply compressed process air provided by a process air source to an air conditioning unit of the aircraft air conditioning system and a trim air line branching off from the process air line upstream of the air conditioning unit and being configured such that trim air flows through the trim air line, the trim air having been branched off from the compressed process air flowing through the process air line. A compressor is arranged in the trim air line and is configured to compress the trim air flowing through the trim air line. A turbine of the aircraft air conditioning system is configured to drive the compressor. A cabin exhaust air line is configured to supply cabin exhaust air discharged from an aircraft cabin to the turbine for driving the turbine.

14 Claims, 3 Drawing Sheets

(51) Int. Cl.
*B60H 1/00* (2006.01)
*B60H 1/32* (2006.01)

(52) U.S. Cl.
CPC ............... *B64D 2013/0611* (2013.01); *B64D 2013/0618* (2013.01); *B64D 2013/0688* (2013.01); *Y02T 50/56* (2013.01)

(58) Field of Classification Search
CPC .... B64D 2013/0618; B64D 2013/0644; B64D 2013/0674; B64D 2013/0648; B64D 2013/0688; B64D 2013/0611; B60H 1/00435; B60H 1/3211
USPC .......................................................... 62/95
See application file for complete search history.

(56) References Cited

U.S. PATENT DOCUMENTS

| | | | |
|---|---|---|---|
| 5,911,388 A * | 6/1999 | Severson | B64D 13/06 244/118.5 |
| 2007/0271952 A1 | 11/2007 | Lui et al. | |
| 2010/0101251 A1 | 4/2010 | Kelnhofer | |
| 2013/0040545 A1 * | 2/2013 | Finney | B64D 13/06 454/71 |
| 2013/0118190 A1 | 5/2013 | Bruno et al. | |
| 2013/0269374 A1 | 10/2013 | Kelnhofer | |

FOREIGN PATENT DOCUMENTS

| | | | | |
|---|---|---|---|---|
| DE | WO 2012079756 A2 * | 6/2012 | ............ | B64D 13/06 |
| EP | 1860026 | 11/2007 | | |
| EP | 2591999 | 5/2013 | | |
| EP | EP 2591999 A2 * | 5/2013 | ............ | B64D 13/02 |
| WO | 2012079756 | 6/2012 | | |

* cited by examiner

AIRCRAFT AIR CONDITIONING SYSTEM AND METHOD OF OPERATING AN AIRCRAFT AIR CONDITIONING SYSTEM

CROSS-REFERENCES TO RELATED APPLICATIONS

This application claims the benefit of the European patent application No. 14 168 774.9 filed on May 19, 2014, the entire disclosures of which are incorporated herein by way of reference.

BACKGROUND OF THE INVENTION

The present invention relates to an aircraft air conditioning system and a method of operating an aircraft air conditioning system.

So-called air-based air conditioning systems, as described, for example, in DE 10 2008 053 320 A1 and US 2010/101251 A1 or DE 10 2010 054 448 A1 and WO 2012/079756 A2, are usually used at present in commercial aircraft to air-condition the aircraft cabin. An aircraft air conditioning system serves to adequately cool or heat the aircraft cabin and to adequately supply fresh air into the aircraft cabin to ensure that a prescribed minimum proportion of oxygen is present in the aircraft cabin. Further, the humidity within the aircraft cabin is adjusted by means of the aircraft air conditioning system. Moreover, during flight operation of the aircraft, the aircraft air conditioning system is used to pressurize the aircraft cabin so as to maintain the pressure within the aircraft cabin, compared to the ambient pressure at the cruising altitude of the aircraft, at an elevated level.

Air-based air conditioning systems typically comprise an air conditioning unit, which is arranged, for example, in a wing root of the aircraft, and which is supplied with compressed process air that is generated by a compressor or bled off from an engine or an auxiliary power unit (APU) of the aircraft. During flight operation of the aircraft, usually engine bleed air is used so as to supply the air conditioning unit of the aircraft air conditioning system with compressed process air. During ground operation of the aircraft the air conditioning unit of the aircraft air conditioning system, however, typically is supplied with compressed process air from the APU of the aircraft. In the air conditioning unit, the process air, upon flowing through at least one heat exchanger as well as through various compression and expansion units, is cooled and expanded. Cooled process air exiting the air conditioning unit finally is supplied to a mixing chamber where it is mixed with recirculation air recirculated from an aircraft region to be air conditioned. The mixed air from the mixing chamber, via respective mixed air lines, is supplied to the aircraft region to be air conditioned which may be divided into a plurality of air conditioning zones.

SUMMARY OF THE INVENTION

The invention is directed to an object of specifying an aircraft air conditioning system which can be operated in a particularly energy-efficient manner. Further, the invention is directed to an object of providing a method of operating an aircraft air conditioning system of this kind.

An aircraft air conditioning system according to the invention comprises a process air line adapted or configured to supply compressed process air provided by a process air source to an air conditioning unit of the aircraft air conditioning system. The process air source might be any source which is suitable to provide compressed process air suitable to be further processed in an air conditioning unit of the aircraft air conditioning system. For example, the process air source may be an engine or an APU of an aircraft equipped with the aircraft air conditioning system. During operation of the aircraft air conditioning system, compressed process air flows through the process air line, which compressed process air is bled off, for example, from the engine or the APU of the aircraft equipped with the aircraft air conditioning system. Preferably, the process air line extends through the air conditioning unit of the air conditioning system such that the process air flowing through the process air line, upon being processed within various components of the air conditioning unit is compressed, expanded, heated or cooled and finally exits the air conditioning unit as cooled and expanded process air which may be supplied to a mixing chamber of the air conditioning system.

The aircraft air conditioning system further comprises a trim air line branching off from the process air line. Specifically, the trim air line branches off from the process air line upstream of the air conditioning unit. The term "upstream," in this context, refers to a direction of flow of the process air through the process air line. The trim air line thus is configured so that trim air will flow through it which has been branched off from the compressed process air flowing through the process air line upstream of the air conditioning unit. Preferably, the trim air line is connected to a trim air distribution system comprising a plurality of trim air distribution lines which serve to supply the trim air to a mixed air line connecting the mixing chamber of the air conditioning system to an aircraft cabin, i.e., an aircraft region to be air conditioned, for fine adjustment of the temperature of the mixed air supplied to the aircraft cabin.

A compressor is arranged in the trim air line. The compressor is adapted to compress the trim air flowing through the trim air line. Due to the presence of the compressor, the trim air, and thus the process air provided by a process air source, can be bled off from the process air source at a relatively low pressure, since, by means of the compressor, the trim air still can be compressed to a pressure which ensures a proper operation of the trim air distribution system which is supplied with trim air via the trim air line. In particular, by compressing the trim air by means of the compressor, pressure losses occurring due to a low permeability of the ducting of the trim air distribution system can be compensated for. As a result, the amount of energy to be provided by the process air source for compressing the process air and hence fuel consumption of the aircraft can be reduced. Furthermore, a compression of the trim air flowing through the trim air line by means of the compressor also leads to an increase of the temperature of the trim air. As a result, the trim air distribution system can be supplied with trim air having a desired high temperature and hence the desired heating effect when being added to mixed air exiting a mixing chamber of the aircraft air conditioning system for fine adjustment of the temperature of the mixed air before being supplied to an aircraft region to be air conditioned.

The aircraft air conditioning system further comprises a turbine adapted to drive the compressor. For example, the compressor and the turbine may be designed in the form of a compressor/turbine arrangement, wherein the compressor and the turbine may by arranged on a common shaft. The aircraft air conditioning system may comprise only one compressor arranged in the trim air line which is driven by only one turbine. It is, however, also conceivable to equip the aircraft air conditioning system with a compressor/ turbine arrangement comprising a plurality of compressors arranged in the trim air line and/or a plurality of turbines.

Finally, the aircraft air conditioning system comprises a cabin exhaust air line adapted to supply cabin exhaust air discharged from an aircraft cabin to the turbine for driving the turbine. The term "aircraft cabin," in the context of this application, should designate any region of the aircraft which is intended to be air-conditioned. For example, an "aircraft cabin" in the sense of the present application may comprise a passenger cabin, a cockpit, an air-conditioned freight compartment, or any other air-conditioned region of the aircraft. In the aircraft air conditioning system, the cabin exhaust air discharged from the aircraft cabin via the cabin exhaust air line thus is used to drive the turbine which in turn drives the compressor for compressing the trim air flowing through the trim air line. Hence, the increase of the pressure of the trim air flowing through the trim air line can be effected in a particularly energy-efficient manner.

In a preferred embodiment of the aircraft air conditioning system, a heat exchanger is disposed in the trim air line. Preferably, the heat exchanger is adapted to thermally couple the trim air flowing through the trim air line with the cabin exhaust air flowing through the cabin exhaust air line so as to pre-heat the cabin exhaust air flowing through the cabin exhaust air line prior to being supplied to the turbine. Hence, the heat exchanger serves as a device which allows the transfer thermal energy from the flow of hot trim air flowing through the trim air line to the relatively cold flow of cabin exhaust air flowing through the cabin exhaust air line. By means of the heat exchanger, the cabin exhaust air thus can be heated to an elevated temperature prior to being supplied to the turbine thus enhancing the operational efficiency of the turbine. Furthermore, the pre-heating of the cabin exhaust air allows the occurrence of free water at an inlet and/or an outlet of the turbine to be avoided or at least minimized.

The aircraft air conditioning system may further comprise a control unit which is adapted to control a flow of cabin exhaust air through the cabin exhaust air line in dependence on a trim air demand of the aircraft air conditioning system. For example, the control unit may be adapted to reduce the flow of cabin exhaust air through the cabin exhaust air line in case of a decreasing trim air demand of the aircraft air conditioning system. Similarly, the control unit may be adapted to increase the flow of cabin exhaust air through the cabin exhaust air line in case of an increasing trim air demand of the aircraft air conditioning system. A control of the flow of cabin exhaust air through the cabin exhaust air line in dependence on the trim air demand of the aircraft air conditioning system ensures that the turbine, in all operational states of the aircraft air conditioning system, is supplied with an amount of cabin exhaust air which is sufficient to provide the necessary amount of driving energy to the compressor so that the compressor in turn is able to provide the desired amount of compressed trim air.

In particular, the control unit may be adapted to control the operation of a cabin exhaust air control valve arranged in the cabin exhaust air line in dependence on a trim air demand of the aircraft air conditioning system. The cabin exhaust air control valve may be arranged in the cabin exhaust air line upstream of the heat exchanger for pre-heating the cabin exhaust air prior to being supplied to the turbine, wherein the term "upstream," in this context, refers to the direction of flow of the cabin exhaust air through the cabin exhaust air line. For example, the cabin exhaust air control valve may be designed in the form of a solenoid valve and may have a variable cross-sectional area. The control unit then may control the operation of the cabin exhaust air control valve so as to reduce the cross-sectional area of the cabin exhaust air control valve in order to adjust the flow of cabin exhaust air through the cabin exhaust air line to a reduced trim air demand. Similarly, the control unit may control the operation of the cabin exhaust air control valve so as to increase the cross-sectional area of the cabin exhaust air control valve in order to increase the flow of cabin exhaust air through the cabin exhaust air line in response to an increase of the trim air demand of the aircraft air conditioning system.

Furthermore, the control unit may be adapted to control the operation of a trim air control valve arranged in the trim air line in dependence on a trim air demand of the aircraft air conditioning system. The trim air control valve may be arranged in the trim air line upstream of a trim air distribution system comprising a plurality of trim air distribution lines, wherein the term "upstream," in this context, refers to the direction of flow of the trim air through the trim air line. Similar to the cabin exhaust air control valve, also the trim air control valve may be designed in the form of a solenoid valve and may have a variable cross-sectional area. The flow of trim air through the trim air line and hence the supply of trim air to the trim air distribution system then may be controlled by appropriately controlling the cross-sectional area of the trim air control valve. Specifically, the control unit may be adapted to control the operation of the cabin exhaust air control valve and the trim air control valve in a linked manner so as to modulate the flow of cabin exhaust air through the cabin exhaust air line synchronized with the trim air demand of the aircraft air conditioning system and hence the supply of trim air to the trim air distribution system.

The aircraft air conditioning system may further comprise a turbine exhaust air line. The turbine exhaust air, due to being expanded in the turbine, has a low temperature. For example, the temperature of the turbine exhaust air may be as low as −61° C. The turbine exhaust air line therefore may be adapted to discharge the turbine exhaust air to a heat source present on board the aircraft so as to cool the heat source. For example, the turbine exhaust air line may open into a ram air channel of the aircraft air conditioning system, wherein the turbine exhaust air may be used to cool a heat exchanger arrangement which is disposed in the ram air channel and which, for example, may have hot process air flowing through it which is intended to be supplied to the air conditioning unit of the aircraft air conditioning system. Alternatively, it is however also conceivable that the turbine exhaust air line is connected to any other cooling medium channel present on board the aircraft equipped with the aircraft air conditioning system which serves to supply a cooling medium to a heat source present on board the aircraft.

Preferably, the turbine exhaust air line opens into the ram air channel of the aircraft air conditioning system or another cooling medium channel via an ejector disposed in the ram air channel or the other cooling medium channel. The ejector ensures that the turbine exhaust air is supplied to the ram air channel or the other cooling medium channel at a desired pressure and a desired flow rate.

In a preferred embodiment, the aircraft air conditioning system further comprises a connecting line connecting the trim air line to the process air line. Preferably, the connecting line branches off from the trim air line downstream of the compressor and upstream of the trim air control valve, wherein the terms "downstream" and "upstream," in this context, refer to the direction of flow of the trim air through the trim air line. The connecting line may be adapted to discharge excess trim air from the trim air line into the process air line. Preferably, the connecting line opens into the process air line upstream of the air conditioning unit and preferably also upstream of a first heat exchanger, wherein, in this context, the term "upstream" refers to the direction of flow of the process air through the process air line. The excess trim air which is discharged from the trim air line then is supplied to the process air line at a position at which the process air flowing through the process air line still has not been subjected to major pressure or temperature variations.

In an aircraft air conditioning system which is equipped with a connecting line, excess trim air can be re-used as process air to be supplied to the air conditioning unit of the aircraft air conditioning system. This allows a particularly efficient operation of the aircraft air conditioning system. Furthermore, the control of the cabin exhaust air control valve and the trim air control valve is simplified, since it is no longer necessary to adjust the flow of cabin exhaust air through the cabin exhaust air line exactly in dependence on the trim air demand of the aircraft air conditioning system.

Preferably, a further compressor is arranged in the process air line. The further compressor may be adapted to compress the process air flowing through the process air line. The presence of the further compressor in the process air line ensures that the air conditioning unit of the aircraft air conditioning system can be supplied with process air at a pressure which is high enough to allow an efficient operation of the air conditioning unit although the process air is bled off from the process air source at a relatively low pressure. The compressor arranged in the trim air line may be designed to as to compress a relatively low flow of trim air to a high pressure with a high efficiency. To the contrary, the further compressor arranged in the process air line may be adapted to compress a much higher flow of process air. For example, the flow of process air through the process air line which is compressed by means of the further compressor may be six times higher than the flow of trim air through the trim air line which is compressed by means of the compressor.

The turbine may be adapted to drive the further compressor arranged in the process air line. For example, the compressor arranged in the trim air line and the further compressor arranged in the process air line may be arranged on a common shaft. The further compressor arranged in the process air line, like the compressor arranged in the trim air line, then may be provided with driving energy from the turbine supplied with cabin exhaust air via the cabin exhaust air line. The compressor, the further compressor and the turbine then may form a compressor/turbine arrangement comprising two compressors and one turbine.

The compressor and the further compressor may be arranged in series or in parallel as desired. In case the compressor and the further compressor are arranged in series, the process air first is directed through the further compressor. From the exit of the further compressor, a first partial flow of compressed process air, via the process air line, is directed to the air conditioning unit of the aircraft air conditioning system. In addition thereto, a second partial flow of compressed process air exiting the further compressor is branched off from the first partial flow and, as a flow of trim air, is directed to the compressor, wherein it is further compressed and finally supplied to the trim air distribution system. In case the compressor and the further compressor are arranged in parallel, a first partial flow of process air provided by the process air source is directed to the further compressor, wherein it is compressed and finally, via the process air line, is directed to the air conditioning unit of the aircraft air conditioning system. Parallel thereto, a second partial flow of process air provided by the process air source, as a flow of trim air, is directed to the compressor, wherein it is compressed and finally, via the trim air line, is directed to the trim air distribution system.

In a method of operating an aircraft air conditioning system, compressed process air provided by a process air source is supplied to an air conditioning unit of the aircraft air conditioning system via a process air line. Trim air branched off from the compressed process air flowing through the process air line is directed through a trim air line branching off from the process air line upstream of the air conditioning unit. The trim air flowing through the trim air line is compressed by means of a compressor arranged in the trim air line. The compressor is driven by means of a turbine. Cabin exhaust air discharged from an aircraft cabin is supplied to the turbine via a cabin exhaust air line for driving the turbine.

The trim air flowing through the trim air line may be thermally coupled with the cabin exhaust air flowing through the cabin exhaust air line by means of a heat exchanger disposed in the trim air line so as to pre-heat the cabin exhaust flowing through the cabin exhaust air line prior to being supplied to the turbine.

A flow of cabin exhaust air through the cabin exhaust air line may be controlled in dependence on a trim air demand of the aircraft air conditioning system.

The operation of a cabin exhaust air control valve arranged in the cabin exhaust air line may be controlled in dependence on a trim air demand of the aircraft air conditioning system. Alternatively or additionally thereto, the operation of a trim air control valve arranged in the trim air line may be controlled in dependence on a trim air demand of the aircraft air conditioning system.

Turbine exhaust air may be discharged to a heat source present on board the aircraft so as to cool the heat source.

Excess trim air from the trim air line may be discharged into the process air line via a connecting line connecting the trim air line to the process air line.

The process air flowing through the process air line may be compressed by means of a further compressor arranged in the process air line. The further compressor may be driven by the turbine which also drives the compressor arranged in the trim air line to allow the use of process air at a low pressure which increases the energy efficiency of the cycle of the process air source.

BRIEF DESCRIPTION OF THE DRAWINGS

Preferred embodiments of the invention now are described in greater detail with reference to the appended schematic drawings, wherein.

DETAILED DESCRIPTION OF THE PREFERRED EMBODIMENTS

Figure 1:
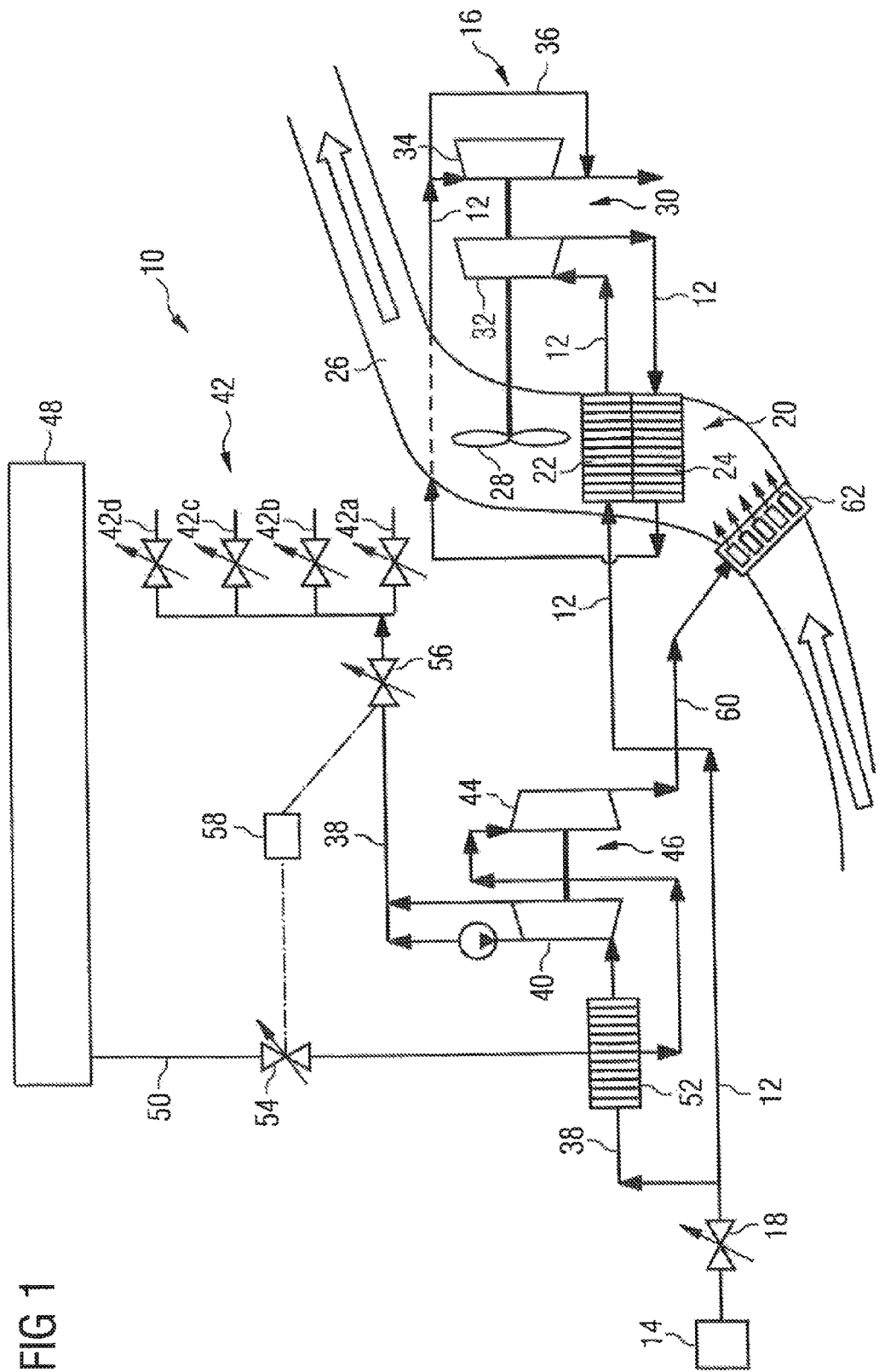
FIG. 1 shows a schematic representation of a first embodiment of an aircraft air conditioning system.

FIG. 1 shows an aircraft air conditioning system 10 comprising a process air line 12 which, during operation of the aircraft air conditioning system 10, has hot compressed process air flowing through it. A first end of the process air line 12 is connected to a process air source 14 which, for example, may be an engine or an APU of an aircraft equipped with the air conditioning system 10. The process air bled off from the process air source 14, via the process air line 12, is directed to an air conditioning unit 16 of the air conditioning system 10 and a flow control valve 18, which is disposed in the process air line 12, serves to control the flow of process air through the process air line 12.

The air conditioning unit 16 comprises a heat exchanger unit 20 which, in the exemplary embodiment of an aircraft air conditioning system 10 depicted in FIG. 1, comprises a first heat exchanger 22 and a second heat exchanger 24. The first and the second heat exchanger 22, 24 of the heat exchanger unit 20 are disposed in the process air line 12 and, furthermore, are arranged within a ram air channel 26. During operation of the aircraft air conditioning system 10, ambient air flows through the ram air channel 26, wherein the flow of ambient air through the ram air channel 26 is controlled by means of a ram air channel inlet flap and a ram air channel outlet flap (not shown). In particular, the flow of ambient air through the ram air channel 26 is controlled by appropriately controlling the ram air channel inlet flap and the ram air channel outlet flap between a closed position and an open position.

During flight operation of an aircraft equipped with the aircraft air conditioning system 10, the flow of ambient air through the ram air channel 26 is induced by a ram pressure prevailing in an inlet region of the ram air channel 26. During ground operation of the aircraft, ambient air is conveyed through the ram air channel 32 by means of a conveying device 28 which is disposed in the ram air channel 26 downstream of the heat exchanger unit 20, wherein the term "downstream," in this context, refers to the direction of flow of the ambient air through the ram air channel 26. The conveying device 28 is designed in the form of a blower and is driven by means of a compressor/turbine unit 30 of the aircraft air conditioning unit 16. The conveying device 28 and the compressor/turbine unit 30 are disposed on a common shaft.

Process air flowing through the process air line 12, in the first heat exchanger 22 of the heat exchanger unit 20, is brought into thermal contact with the ambient air flowing through the ram air channel 26 and thus is cooled by the transfer of thermal energy to the ambient air flowing through the ram air channel 26. Downstream of the first heat exchanger 22, the process air line 12 extends to a compressor 32 of the compressor/turbine unit 30, wherein the term "downstream," in this context, refers to the direction of flow of the process air through the process air line 12. Within the compressor 32, the process air is compressed and heated.

Process air exiting the compressor 32, via the process air line 12, is supplied to the second heat exchanger 24 of the heat exchanger unit 20. Upon flowing through the second heat exchanger 24, the process air again is cooled by the transfer of thermal energy to the ambient air flowing through the ram air channel 26. Process air exiting the second heat exchanger 24, via the process air line 12, may be directed through further components to the air conditioning unit 16 such as a re-heater, a condenser, a water extractor, etc. (not shown) before it is supplied to a turbine 34 of the compressor/turbine unit 30. Furthermore, the process air exiting the second heat exchanger 24 may be directed through a bypass line 36 which bypasses the turbine 34 of the compressor/turbine unit 30 and again opens into the process air line 12 downstream of the turbine 34 of the compressor/turbine unit 30. Finally, the process air flowing through the process air line 12 is supplied to a mixing chamber (not shown in FIG. 1) of the aircraft air conditioning system 10.

In the aircraft air conditioning system 10 according to FIG. 1, a trim air line 38 branches off from the process air line 12 between the flow control valve 18 and the air conditioning unit 16. The trim air line 38 is configured so that trim air will flow through it, the trim air having been is branched off from the compressed process air flowing through the process air line 12. A compressor 40 is arranged in the trim air line 38 which serves to compress the trim air flowing through the trim air line 38. As becomes apparent from FIG. 1, the trim air may exit the compressor 40 at two different stages of the compressor. Hence, the pressure of the trim air exiting the compressor 40 can be adjusted as desired by appropriately adjusting the partial flows of the trim air which exit the compressor 40 at a first stage and hence at a lower pressure and at a second stage and hence at a higher pressure, respectively. Due to the presence of the compressor 40, the trim air and thus the process air provided by the process air source 14 can be bled off from the process air source 14 at a relatively low pressure, since, by means of the compressor 40, the trim air still can be compressed to a pressure which ensures a proper operation of a trim air distribution system 42 which comprises a plurality of trim air distribution lines 42*a-d* and which is supplied with trim air via the trim air line 38.

The aircraft air conditioning system 10 further comprises a turbine 44 which is adapted to drive the compressor 40. In particular, the compressor 40 and the turbine 44 are arranged on a common shaft and thus form a compressor/turbine arrangement 46. In order to drive the turbine 44, the turbine 44 is supplied with cabin exhaust air which is discharged from an aircraft cabin 48 via a cabin exhaust air line 50. A heat exchanger 52 which is disposed in the trim air line 38 serves to thermally couple the hot trim air flowing through the trim air line 38 with the cabin exhaust air flowing through the cabin exhaust air line 50 so as to pre-heat the cabin exhaust air flowing through the cabin exhaust air line 50 prior to being supplied to the turbine 44. By pre-heating the cabin exhaust air prior to being supplied to the turbine 44, the operational efficiency of the turbine 44 can be enhanced and the occurrence of free water at an inlet and/or an outlet of the turbine 44 can be avoided or at least minimized.

The flow of cabin exhaust air through the cabin exhaust air line 50 is controlled by means of a cabin exhaust air control valve 54. The flow of trim air through the trim air line 38 downstream of the compressor 40 is controlled by means of a trim air control valve 56. Furthermore, the aircraft air conditioning system 10 comprises a control unit 58 which is adapted to control the flow of cabin exhaust air through the cabin exhaust air line 50 in dependence on a trim air demand of the aircraft air conditioning system 10. In particular, the control unit 58 controls the operation of the cabin exhaust air control valve 54 and the operation of the trim air control valve 56 in a linked manner so as to modulate the flow of cabin exhaust air through the cabin exhaust air line 50 synchronized with the trim air demand of the aircraft air conditioning system 10 and hence the supply of trim air to the trim air distribution system 42.

Moreover, the aircraft air conditioning system 10 comprises a turbine exhaust air line 60. The turbine exhaust air, due to being expanded in the turbine 44, has a low temperature which may be as low as −61° C. Therefore, the turbine exhaust air is suitable to provide cooling energy to a heat source present on board the aircraft equipped with the aircraft air conditioning system 10. In the embodiment of an aircraft air conditioning system 10 depicted in FIG. 1, the turbine exhaust air line 16 opens into the ram air channel 26 so that turbine exhaust air flowing through the turbine exhaust air line 60 is supplied into the ram air channel 26 so as to cool the first and the second heat exchanger 22, 24 of the heat exchanger unit 20. The turbine exhaust air flowing through the turbine exhaust air line 60 is supplied to the ram air channel 26 via an ejector 62. The ejector 62 is disposed in the ram air channel 26 and ensures that the turbine exhaust air is supplied to the ram air channel 26 at a desired pressure and a desired flow rate.

Figure 2:
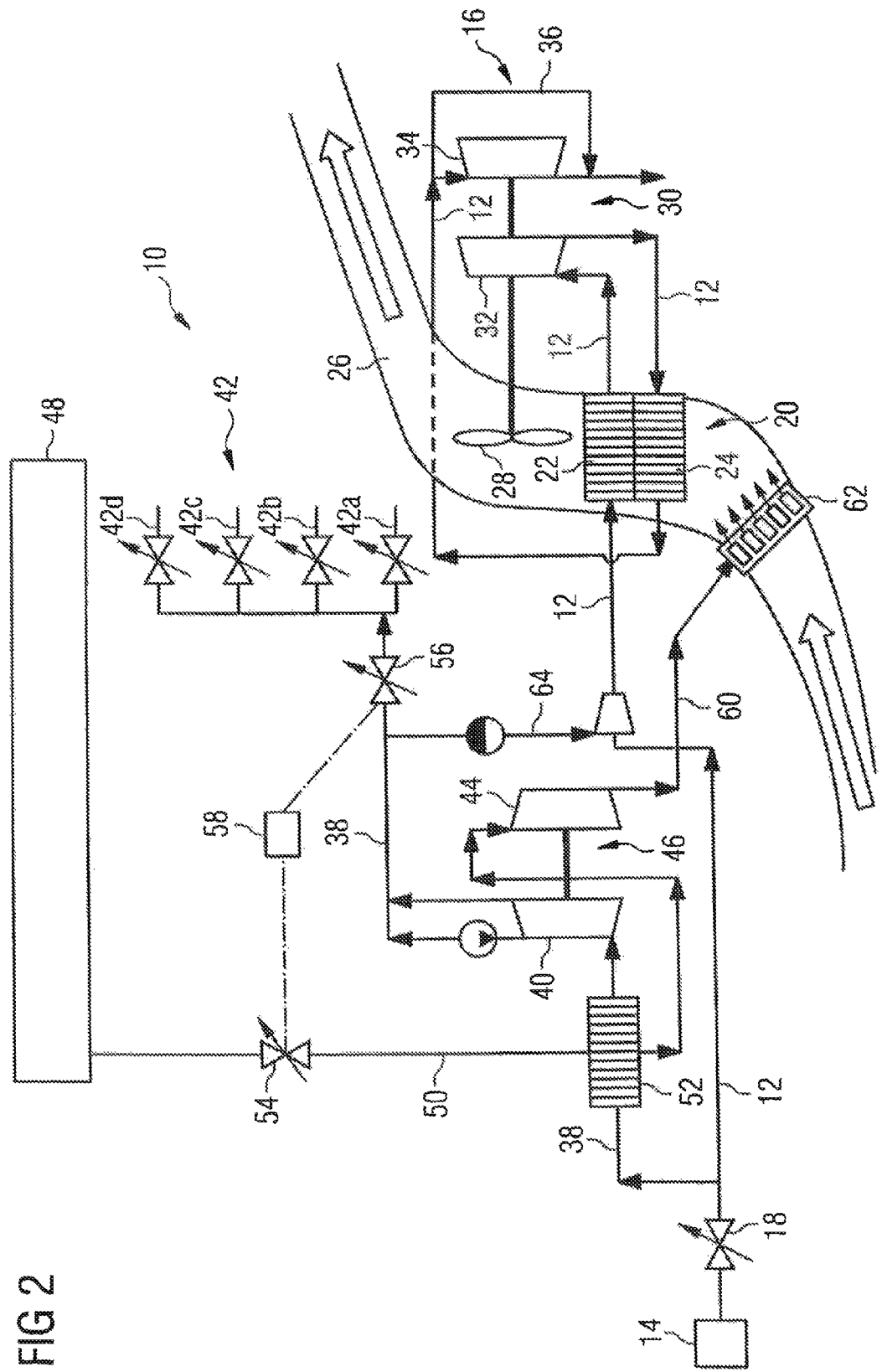
FIG. 2 shows a schematic representation of a second embodiment of an aircraft air conditioning system.

The aircraft air conditioning system 10 according to FIG. 2 differs from the arrangement according to FIG. 1 only in that the aircraft air conditioning system 10 according to FIG. 2 additionally comprises a connecting line 64 which connects the trim air line 38 to the process air line 12. The connecting line 64 is adapted to discharge excess trim air from the trim air line 38 into the process air line 12 and branches off from the trim air line 38 downstream of the compressor 40 and upstream of the trim air control valve 56. The connecting line 64 opens into the process air line 12 upstream of the air conditioning unit 16 so that the excess trim air which is discharged from the trim air line 38 is supplied to the process air line 12 at a position at which the process air flowing through the process air line 12 still has not been subjected to major pressure or temperature variations. Otherwise, the structure and the function of the aircraft air conditioning system 10 depicted in FIG. 2 correspond to the structure and the function of the arrangement shown in FIG. 1.

Figure 3:
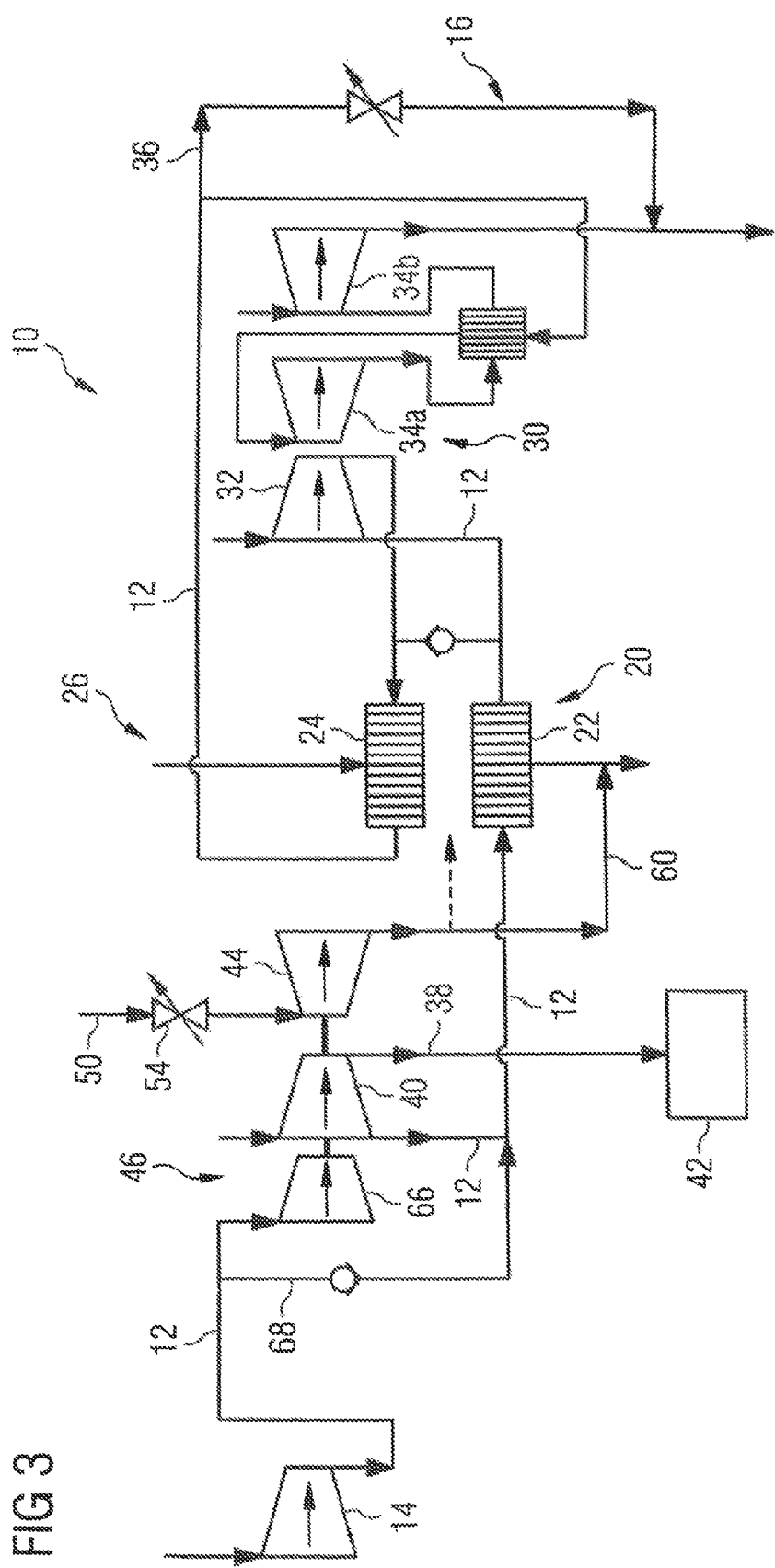
FIG. 3 shows a schematic representation of a third embodiment of an aircraft air conditioning system.

The aircraft air conditioning system 10 shown in FIG. 3 differs from the arrangement according to FIG. 1 in that the air conditioning unit 16, instead of only one turbine 34, comprises two turbines 34*a*, 34*b* arranged in series. Furthermore, the aircraft air conditioning system 10 according to FIG. 3 is equipped with a further compressor 66 which is arranged in the process air line 12 upstream of the air conditioning unit 16 and which is adapted to compress the process air flowing through the process air line 12 prior to being supplied to the air conditioning unit 16. In this context, the term "upstream" refers to the direction of flow of process air through the process air line 12.

Due to the presence of the further compressor 66, the air conditioning unit 16 can be supplied with process air at a pressure which is high enough to allow a particularly efficient operation of the air conditioning unit 16, although the process air is bled off from the process air source 14 at a relatively low pressure. While the compressor 40 arranged in the trim air line 38 is designed so as to compress a relatively low flow of trim air to a high pressure with a high efficiency, the further compressor 66 arranged in the process air line 12 is adapted to compress a much higher flow of process air. In particular, the flow of process air through the process air line 12, which is compressed by means of the further compressor 66, may be six times higher than the flow of trim air through the trim air line 38, which is compressed by means of the compressor 40.

The compressor 40 arranged in the trim air line 38 and the further compressor 66 arranged in the process air line 12 are arranged on a common shaft with the turbine 44 which is supplied with cabin exhaust air via the cabin exhaust air line 50. Thus, like the compressor 40, also the further compressor 66 is driven by means of the turbine 44 so that the compressor 40, the further compressor 66 and the turbine 44 form a compressor/turbine arrangement 46 comprising two compressors 40, 66 and one turbine 44.

In the specific embodiment of an aircraft air conditioning system 10 depicted in FIG. 3, the compressor 40 and the further compressor 66 are arranged in series. Process air provided by the process air source 14 thus first is supplied to the further compressor 66. From the exit of the further compressor 66, a first partial flow of compressed process air, via the process air line 12, is directed to the air conditioning unit 16. A second partial flow of compressed process air existing the further compressor 66, however, is branched off from the first partial flow and, as a flow of trim air, is directed to the compressor 40, wherein it is further compressed and finally supplied to the trim air distribution system 42.

Finally, the aircraft air conditioning system 10 shown in FIG. 3 comprises a bypass line 68 which branches off from the process air line 12 upstream of the further compressor 66 and again opens into the process air line 12 downstream of the further compressor 66, wherein the terms "upstream" and "downstream," in this context, refer to the direction of flow of the process air through the process air line 12. Thus, process air flowing through the bypass line 68 bypasses the further compressor 66. By appropriately controlling the flow of process air through the bypass line 68 the pressure of the process air flowing through the process air line 12 downstream of the further compressor 66 can be controlled as desired. Otherwise, the structure and the function of the aircraft air conditioning system 10 according to FIG. 3 correspond to the structure and the function of the arrangement depicted in FIG. 1.

While specific features of the aircraft air conditioning system 10 herein have been described with reference to specific embodiments, these features can be combined as desired. For example, the aircraft air conditioning system 10 depicted in FIG. 2 may be equipped with a further compressor 66 or the aircraft air conditioning system 10 depicted in FIG. 3 may be equipped with a connecting line 64.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft air conditioning system comprising:
   a process air line configured to supply compressed process air provided by a process air source to an air conditioning unit of the aircraft air conditioning system,
   a trim air line branching off from the process air line upstream of the air conditioning unit and being configured such that trim air will flow through the trim air line, the trim air having been branched off from the compressed process air flowing through the process air line,
   a compressor arranged in the trim air line and being configured to compress the trim air flowing through the trim air line, a turbine configured to drive the compressor, a cabin exhaust air line configured to supply cabin exhaust air discharged from an aircraft cabin to the turbine for driving the turbine, and a connecting line connecting the trim air line to the process air line and being configured to discharge excess trim air from the trim air line into the process air line.

2. The aircraft air conditioning system according to claim 1, wherein a heat exchanger is disposed in the trim air line, the heat exchanger being configured to thermally couple the trim air flowing through the trim air line with the cabin exhaust air flowing through the cabin exhaust air line so as to pre-heat the cabin exhaust air flowing through the cabin exhaust air line prior to being supplied to the turbine.

3. The aircraft air conditioning system according to claim 1, further comprising a control unit configured to control a flow of cabin exhaust air through the cabin exhaust air line in dependence on a trim air demand of the aircraft air conditioning system.

4. The aircraft air conditioning system according to claim 3, wherein the control unit is configured to control at least one of the operation of a cabin exhaust air control valve arranged in the cabin exhaust air line and the operation of a trim air control valve arranged in the trim air line in dependence on a trim air demand of the aircraft air conditioning system.

5. The aircraft air conditioning system according to claim 1, further comprising a turbine exhaust air line configured to discharge turbine exhaust air to a heat source present on board the aircraft so as to cool the heat source.

6. The aircraft air conditioning system according to claim 1, wherein a second compressor is arranged in the process air line and being configured to compress the process air flowing through the process air line.

7. The aircraft air conditioning system according to claim 6, wherein the turbine is configured to drive the second compressor arranged in the process air line.

8. A method of operating an aircraft air conditioning system, the method comprising:

supplying compressed process air provided by a process air source to an air conditioning unit of the aircraft air conditioning system via a process air line, directing trim air branched off from the compressed process air flowing through the process air line through a trim air line branching off from the process air line upstream of the air conditioning unit, compressing the trim air flowing through the trim air line by means of a compressor arranged in the trim air line, driving the compressor by means of a turbine, and supplying cabin exhaust air discharged from an aircraft cabin to the turbine via a cabin exhaust air line for driving the turbine, wherein excess trim air from the trim air line is discharged into the process air line via a connecting line connecting the trim air line to the process air line.

9. The method according to claim 8, wherein the trim air flowing through the trim air line is thermally coupled with the cabin exhaust air flowing through the cabin exhaust air line by means of a heat exchanger disposed in the trim air line so as to pre-heat the cabin exhaust air flowing through the cabin exhaust air line prior to being supplied to the turbine.

10. The method according to claim 8, wherein a flow of cabin exhaust air through the cabin exhaust air line is controlled in dependence on a trim air demand of the aircraft air conditioning system.

11. The method according to claim 10, wherein at least one of the operation of a cabin exhaust air control valve arranged in the cabin exhaust air line and the operation of a trim air control valve arranged in the trim air line is controlled in dependence on a trim air demand of the aircraft air conditioning system.

12. The method according to claim 8, wherein turbine exhaust air is discharged to a heat source present on board the aircraft so as to cool the heat source.

13. The method according to claim 8, wherein the process air flowing through the process air line is compressed by means of a second compressor arranged in the process air line, wherein the second compressor is driven by the turbine.

14. The method according to claim 13, wherein the second compressor is driven by the turbine to allow the use of process air at a low pressure which increases the energy efficiency of the cycle of the process air source.

* * * * *